United States Patent Office 3,175,213
Patented Mar. 23, 1965

3,175,213
TRACKING RADAR SYSTEMS
Arthur A. Varela, Alexandria, Va., assignor, by mesne assignments, to the United States of America as represented by the Secretary of the Navy
Filed Dec. 26, 1962, Ser. No. 247,415
12 Claims. (Cl. 343—11)

The present invention relates to radar systems employing fixed array antennas and more particularly, relates to radar systems employing one or more plane array antennas with which the frequency of the radiated signal determines the beam position in one plane and the beam position in the other plane is determined by other electronic phasing means.

In previously devised systems the relative phase of the several signal channels has been controlled by the degree of magnetization of ferrite phase shifters or by the phase of local heterodyne signals using a delay line with variable frequency of other active electronic means of control. These techniques have serious disadvantages in that a high degree of phase fidelity and reproducibility is required in active circuit components, i.e., in the ferrites and associated drive circuits in the former of the above cases or in the frequency converters and r-f amplifiers in the other case. Since phase must be determined for both transmit and receive conditions, a very wide range in signal amplitude must be accommodated.

In the system according to the present invention, a passive waveguide lens arrangement is employed to produce the required phase relationship. The employment of such a lens eliminates the need of previously used active drive circuits in which phase fidelity must be insured. In the present invention, the only active electronic components in which phase fidelity is required are in the transmitting power amplifiers. Phase changes in these amplifiers can be monitored and automatically controlled by fairly simple circuitry if required. In the present system, the only components that can affect the relative phase are the lens itself and those components on the antenna side of the lens. However, since the lens employed is passive and linear, it presents no phasing problems once it is set up properly.

Accordingly, it is an object of the present invention to provide passive means for producing phase control in a radar system employing fixed array antennas.

Another object of the present invention is to reduce the number of active circuit components required for phasing in a radar system employing fixed array antennas.

Yet another object of the present invention is the provision of passive means for producing phase fidelity in a monopulse or simultaneous lobing radar system.

Figure 1:
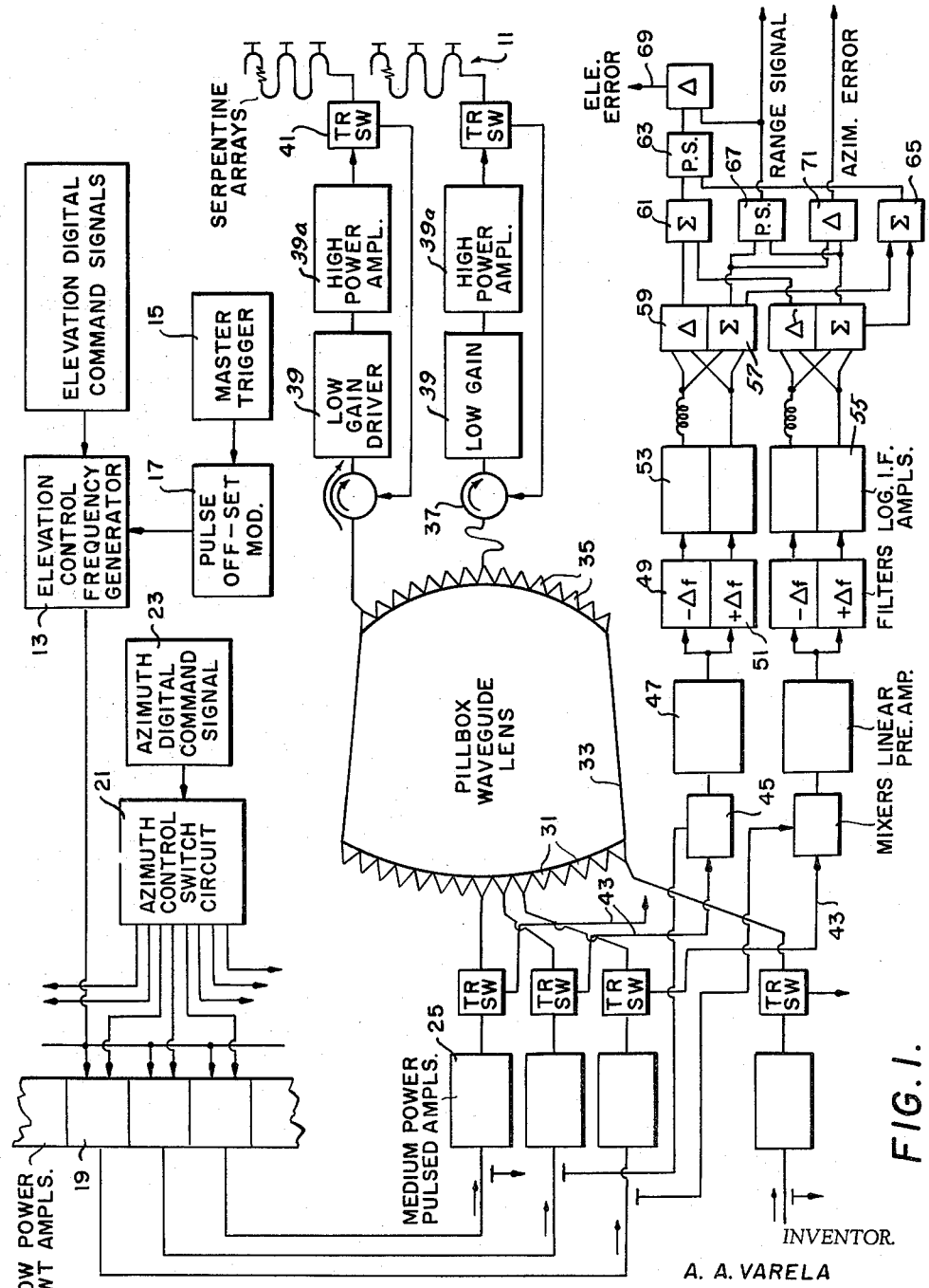
Figure 2:
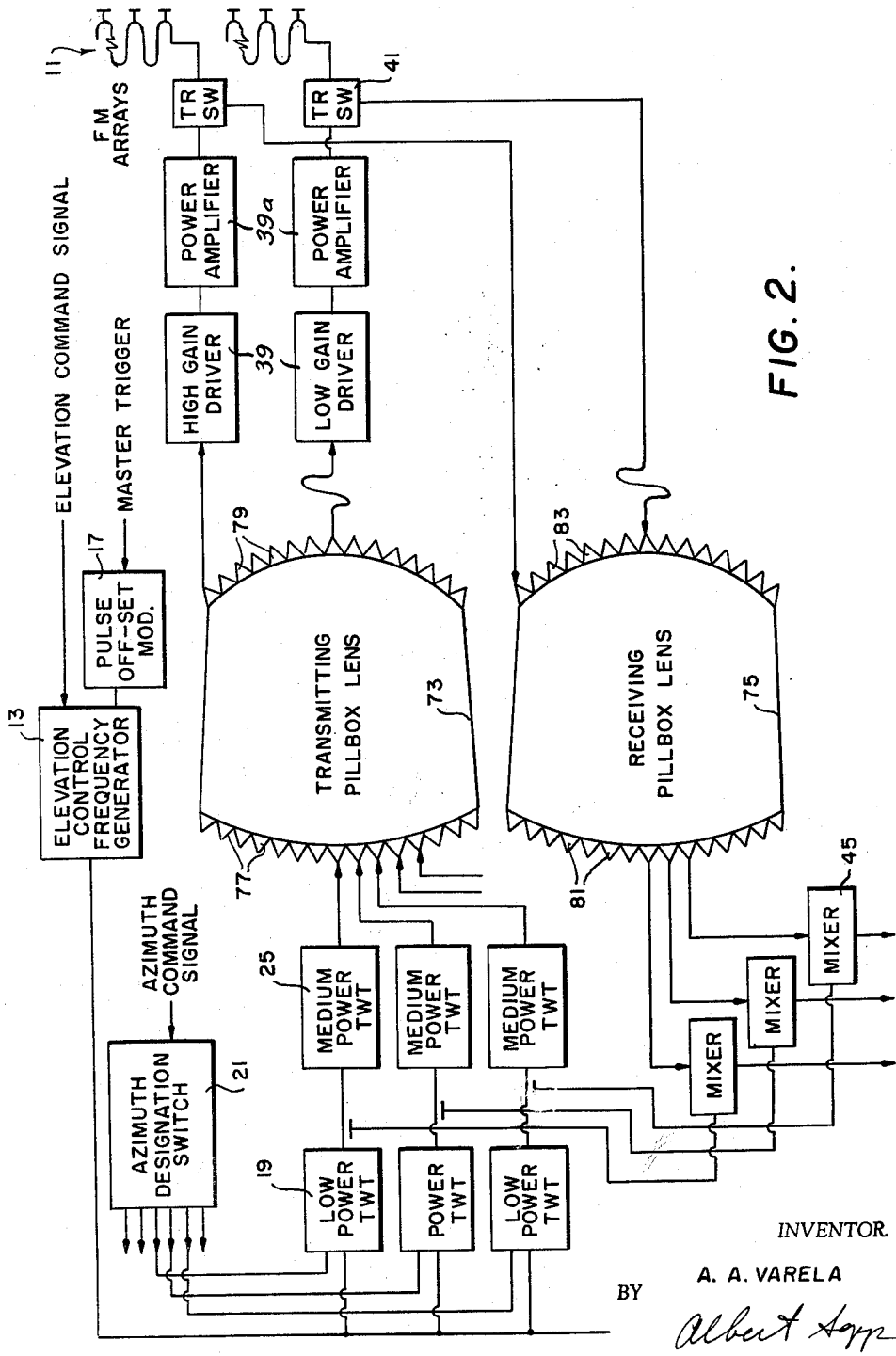
Figure 3:
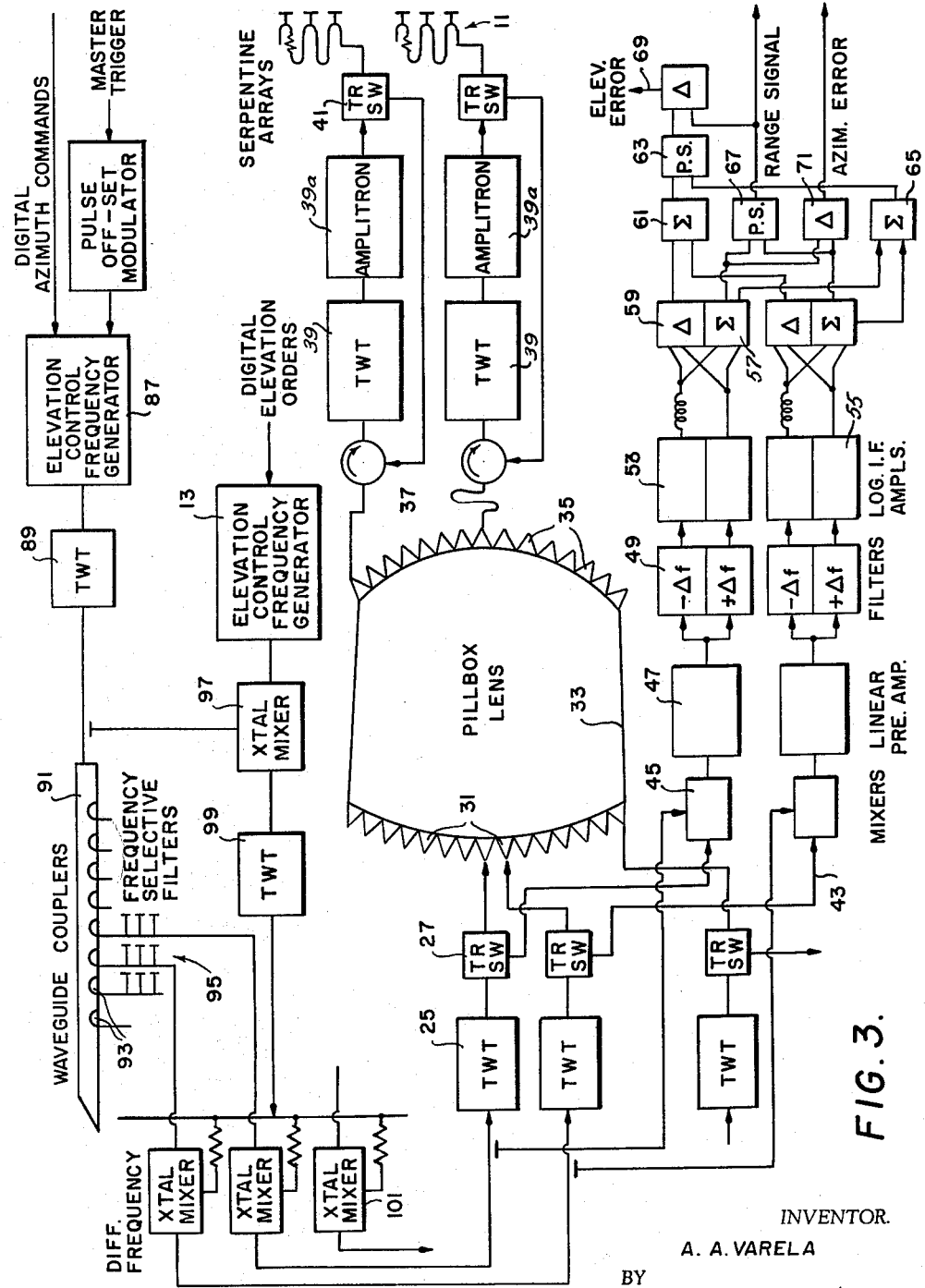

These and other objects as well as features and advantages of the present invention will be better understood by referring to the accompanying drawings in which like numerals are used to represent like parts, and in which:

FIGS. 1, 2 and 3 are schematic block diagrams illustrating different embodiments of a radar system according to the invention.

Referring to the illustrative embodiment of the invention, as shown in FIG. 1, a directive radar transmitting receiving antenna 11 is shown in the form of two elements of a large number of vertical serpentine wave guides or suitable frequency deflective linear array which is suitable for monopulse operation and which may be controlled by relative phase of the array signals. The antenna may take any one of a number of forms which are well known in the art, and the invention is not limited to any particular type of antenna.

In producing the signals to be transmitted from the antenna, a low power CW signal is generated by an elevation control frequency generator 13 whose frequency is proportional to or in correspondence with the desired tilt of the antenna beam in the vertical plane relative to the antenna plane but which is to be offset by an amount equal to the intermediate frequency of the receiver. The amount of desired tilt may be fed into the generator 13 by means of digital command signals as indicated in legend. The pulse to be transmitted is initiated by a master trigger pulse generator 15 of any suitable design and is fed to a pulse off-set modulator 17. The purpose of the pulse off-set modulator 17 is to produce an output which is fed to the elevation control frequency generator 13 for causing, by means of a suitable frequency responsive circuit such as a reactance tube circuit or the like, the elevation control frequency generator 13 to shift frequency by an amount equal to the intermediate frequency off-set. Moreover, the output of the pulse off-set modulator causes the elevation control frequency generator 13 to change frequency at a linear rate through its average value or to jump frequency from one side of the average value to the other side of the average value at half pulse intervals.

The employment of an average frequency offset permits the CW signal to serve not only as transmitted pulse generator but as the local oscillator during reception. The purpose of the frequency modulation or half-pulse jump is to make the transmitted beam in effect scan across or sequentially lobe over the two receiving lobe positions to permit determination of elevation error by comparison.

The varying frequency output signal of the elevation control generator is applied to a bank of low power wide band amplifiers such as traveling wave tubes 19. There is one of these traveling wave tubes 19 for each of the azimuth beam positions, and the tubes are normally blocked.

An azimuth control switch circuit 21 which may be in the form of a bank of selectively or sequentially energizable switching elements such as a ring counter chain or any other suitable means is connected to a source 23 of programmed azimuth digital command control signals. The output of the source 23 represents tracking command signals, and these signals are applied to the azimuth control switching circuit 21 for action as unblocking pulses for the total range trace duration to two adjacent traveling wave tubes of the bank 19 corresponding to the desired azimuth of the transmitted beam. The outputs of the energized adjacent pair of traveling wave tubes of the bank 19 are then fed to a corresponding pair respectively of a bank of medium power pulsed amplifiers or traveling wave tubes 25. The outputs of the energized pair of pulsed amplifiers 25 are then fed to a corresponding pair respectively of a bank of conventional transmit receive switches 27.

One output of each of the transmit receive switches 27 is connected to an input element of a bank of input coupling elements 31 on the terminal side of a microwave lens unit 33. The waves are fed into the microwave lens unit 33 by means of the input coupling elements 31 all of which may be in the form of probes, loops, or waveguide horns.

The lens unit 33 may be of the parasitic array type described by H. Gent at pages 47–57 of the Royal Radar Establishment Journal, vol. 40 of October 1957. This publication is available at the Library of the Bureau of Standards, Washington, D.C. In the Gent article, there is described a parasitic array microwave lens wherein an electromagnetic wave arriving at a point on the input surface emerges from a definite corresponding point on the output surface with a fixed phase delay or with a predetermined, varied phase delay independent of its angle of incidence. The behavior of such a lens, given the shape of its input and output surfaces, the relative position of corresponding elements in the two surfaces and the length of the transmission line joining corresponding elements in the two surfaces, may be calculated.

The lens itself may consist of a reflecting sheet with an array of dipoles or slot radiators disposed in front of the sheet, every dipole feeding a transmission line which passes through the sheet into the interior of the lens. When all of the transmission lines are terminated with matched loads, a single lens surface will act as a perfect absorber of incident radiation. The complete lens has two surfaces, every dipole or slot radiator of one surface being connected to a corresponding dipole or slot radiator of the other surface by an appropriate transmission line length. The lenses may take the form of several types, and they may be two dimensional or three dimensional.

The microwave lens unit 33 may be made of two parallel conducting sheets separated from each other by about a half the longest free space wavelength, and the propagation therethrough from each energized pair of input elements is in the TE mode with the electric vector perpendicular to the two sheets. The lens unit 33 on its terminal or input side is in the shape of an arc of a circle with its radius equal to the distance between the center point of the input or terminal side of the lens and the center point of the antenna side of the lens. The input elements are mounted along the focal locus, i.e., the arc on the terminal side of the lens unit 33.

The output or antenna side of the lens unit 33 is in the form of approximately a parabola—a curve such that with account taken for differences inserted in the individual transmission line lengths in the lens unit and input and output coupling elements a linear phase relation is obtained. A bank of input coupling elements 35 which, like the input elements 31, may be microwave probes, loops, or waveguide horns, are mounted along the focal locus of the curved lens portion on the antenna side of the lens unit 33, there being one corresponding output element for each input element. Faraday circulators 37 or other suitable non-reciprocal microwave transmitting elements which permit received signals to be returned to the lens unit via the same elements but via a different path as the transmitted signals without interference, are mounted, one for each of the corresponding output elements 35, along the approximately parabolic curve on the antenna side of the lens unit 33.

The exact shape of the curve on the antenna side of the lens unit 33 may be obtained by graphical construction using the coupler positions in the two dimensions and the relative line length from the coupler to the antennna as three degrees of freedom.

Directivity of transmission in a TE mode through the lens unit 33 is accomplished in a conventional manner by means of proper design of the probes or horns and the use, if necessary, of director stubs and dielectric wedges, or of any other suitable means. Thus the coupling elements on both sides of the lens unit 33 are given directional patterns so as to approximate as well as possible the desired amplitude taper pattern on the antenna side.

During transmission of pulses, the output of each of the Faraday circulators 37 is fed to a power amplification device including a gain driver 39 and a high power amplifier 39a. Since the signals coupled from the center of the lens unit 33 are attenuated less and do not require as much amplification as the signals from the outer portion of the lens unit, the signals passing through the center require only relatively low gain driving devices as indicated in FIG. 1. The output of each of the amplifying devices 39 is fed to a transmit/receive switch 41 of any suitable design. For monopulse operation, adjacent pairs of the transmit receive switches 41 are energized simultaneously, and the outputs thereof fed to corresponding adjacent pairs of the frequency responsive antenna array elements 11.

With the monopulse operation in which two of the feeds or couplers are excited together, giving a phase center half-way between, the electromagnetic field from the excited couplers propagates in the lens and induces signals in all of the couplers 35 on the antenna side with proportionate phase displacements corresponding to the position of the excited couplers from the center line. The radar echo signals have a corresponding phase relation, and the fields from all of the couplers on the antenna side are coherent in phase at and only at one point on the locus of the terminal couplers, which is the focus locus of the lens.

In receiving, the signal from each array is shunted around the transmitter power amplifying devices 39 and 39a via a waveguide transmission line through the action of the transmit/receive switches 41 and the Faraday circulators 37. All of the received signals fed into the lens unit 33 focus on the terminal coupling locus at a point corresponding to the target azimuth. This point is necessarily within the sector of the transmitted beam so that in the case of monopulse operation the received signal is divided between the two terminal couplers which were active during transmission. The signals from these couplers are directed by the transmit/receive switches into a bank of receiving channels 43, there being one corresponding receiving channel for each coupling element. Thus, each pair of the receiving channels 43 represents one beam position in monopulse operation.

In each of the receiving channels 43 there is a mixer 45 which receives one input from a corresponding one of the traveling wave tubes 19 which acts as a source of local oscillation. The other input to the mixer 45 is the pulse in the corresponding receiving channel 43. The intermediate frequency output of each of the mixers 45 is fed to a linear preamplifier 47 of sufficiently wide bandwidth to match the total pulse bandwidth.

In each of the receiving channels 43 the output pulse of the linear preamplifier 47 is fed into upper and lower half bandwith filters 49 and 51 respectively. The output of each filter bandwith half is then fed into logarithmic intermediate frequency amplifiers 53 and 55 for the upper lower halves respectively. The video output of the logarithmic amplifier that passes the spectrum of the first half of the pulse is delayed by any suitable means (not shown) a half pulse length so that the two pulse halves are concident in time. The difference of the two half pulse outputs is then a measure of the elevation error, i.e., the angular difference between the transmitting beam elevation and the actual target elevation. This difference corresponds to the up-down ratio in signal strength and, except for noise perturbations, it should be the same in the two adjacent receiving channels.

Although the average value of the two difference outputs might be used for elimination of noise, because of the relatively greater compression of bandwidth by the logarithmic amplifiers the noise deviation will be less for the channel on which the sum signal is greater. In the embodiment of the invention shown in FIG. 1, the respective sum and difference amplitudes of the video outputs of the logarithmic amplifiers are produced in sum and difference detectors 57 and 59 respectively.

The difference signal of one energized channel is added to the difference signal of its adjacent energized channel in a suitable summation device 61, the output of which is fed as one input to a peak selector 63. The other input to the peak selector 63 is the sum of the sum signal of the one channnel and the sum signal of the adjacent channel which is fed to the peak selector 63 from a summation device 65. The sum signals of the adjacent channels are also fed to a peak selector 67, the peak of the selected sum being used for range tracking. The selected sum output of the peak selector 67 along with the selected difference output of the peak selector 63 are combined subtractively in a comparator or suitable subtraction device 69, the output of which represents the elevation error signal. The sum signals of the adjacent channels are also fed to a comparator or suitable subtractive device 71 for producing an azimuth error signal.

The summing devices used may be common resistors having a considerably lower value than the resistance of their driving circuits, and the peak selectors may consist of a diode in each line with a common high resistance load.

In the embodiment of the invention shown in FIG. 2, separate parasitic array pill box lenses 73 and 75 each having the same shape at their respective focal loci as the lens unit 33 shown in FIG. 1, are employed for transmitting and receiving. Each of the lenses 73 and 75 is of a thickness of about one quarter of the longest free space wavelength, and they may be disposed in a stack, one on top of the other, for compactness.

The transmitting lens unit 73 is provided on its input side with an array of horn, probe, or loop input coupling elements 77 and output coupling elements 79 of the same design as the elements 31 and 35 respectively discussed in conjunction with FIG. 1. The receiving lens unit 75 is also provided with coupling elements 81 and 83 respectively arrayed on opposite sides thereof.

For monopulse operation with the two lens embodiment only one of the input couplers need be excited at a time. Also, the use of separate lens units for transmitting and receiving eliminates the need of Faraday circulators employed on the antenna side of the single lens unit embodiment of FIG. 1 and also eliminates the need of transmit-receive switches on the input side such as switches 27 shown in FIG. 1. As indicated in FIG. 2 by the use of the same reference numerals as in FIG. 1, the remaining elements employed in conjunction with the two lens embodiment of FIG. 2 may be the same as those of FIG. 1.

In the embodiment shown in FIG. 3, there is shown a block diagram illustrating the use of frequency selective filters, or comb filters 95 rather than the switched traveling wave tubes 19 as shown in FIG. 1 as a means of activating the correct terminal feed points on the lens 33 for the desired azimuth. An azimuth frequency control generator 87 which may be in the form of a digitally controlled oscillator similar to that used in FIG. 1 for generating the elevation control signal, provides azimuth control. The output of the azimuth frequency control generator 87 is fed to a traveling wave tube 89, one output of which is then fed to a waveguide or transmission line 91 having a plurality of coupling points 93 each coupled to one of a bank of progressively turned filter 95 so that as the frequency is changed, the output point moves along the waveguide or transmission line coupling points.

Another output of the traveling wave tube 89 is coupled to a crystal mixer 97, and the mixer 97 is also connected to receive the output of the elevation control signal generator 13 to produce a sum frequency which is applied to a traveling wave tube 99. Each respective filter output of the bank of filters 95 is mixed in a corresponding one of a bank of crystal mixers 101 to each of which is also applied to the output of the traveling wave tube 99. The resulting output of each of the crystal mixers 101 is a difference frequency signal equal in frequency to the frequency of the elevation control frequency generator 13. The ouputs of the respective adjacent pairs of crystal mixers 101 are then applied to corresponding adjacent pairs of medium power pulsed amplifiers or traveling wave tubes 25 for transmission through the lens unit 33 as previously described.

Of course, there must be no overlap in the frequency band used for elevation control and that used for azimuth control. Thus, if the elevation control range, which is also on the radar operating band, were from 2850 to 3150 megacycles, an appropriate band for the azimuth control would be from 2100 to 2400 megacycles.

Obviously many modifications and variations of the present invention are possible in the light of the above teachings. It is therefore to be understood that within the scope of the appended claims the invention may be practiced otherwise than as specifically described.

What is claimed is:

1. A radar tracking system employing fixed array antenna means and having electronic azimuth and elevation controls, comprising:

means for producing elevation control signals;
   means for producing azimuth control signals;
   passive electromagnetic lens means having an essentially circular input surface and an approximately parabolic output surface whereby an electromagnetic wave arriving at the input surface emerges from corresponding point on the output surface with a predetermined phase delay;
   a plurality of electromagnetic input wave coupling elements each connected to a point of the input surface;
   a plurality of output wave coupling elements each connected to a point of the output surface in one-to-one correspondence to said input coupling elements;
   pulsed amplifier means coupled to each of said input elements and to each of said means for producing azimuth and elevation control signals for producing electromagnetic rays at predetermined ones of said points on the input surface of said lens so that a phase controlled scanning pattern is produced by said lens as seen by the output coupling elements;
   output signal path means coupled to each of said output coupling elements for passing signals back and forth between said output coupling elements and the fixed array antenna means;
   signal receiving means; and
   wave path switching means coupled to said pulsed amplifiers for producing at said receiving means return signal information.

2. The system as defined according to claim 1 but further characterized by said output signal path means comprising:

non-reciprocal wave path directing means coupled to each of said output coupling elements;
   a first amplifying signal path coupled to said non-reciprocal wave path directing means for passing signals to said fixed array antenna means; and
   a second signal path coupled to said fixed array antenna means and to said non-reciprocal wave path directing means for supplying to said lens return information signals from the fixed array antenna means.

3. The system as defined according to claim 2 but further characterized by said wave path switching means comprising a transmit/receive switch coupled to each of said input coupling elements and to each of said pulsed amplifier means for directing return information signals to said receiving means.

4. The system as defined according to claim 3 but further characterized by said receiving means having a plurality of channels, each channel comprising a mixer having an input from corresponding ones of said transmit/receive switches respectively and another input from a source of local oscillations;

a linear preamplifier connected to each mixer for receiving the output of each of said mixers;
   an upper and a lower bandwidth filter connected to each preamplifier for receiving the output of each said preamplifier;
   a logarithmic intermediate frequency amplifier for each of said preamplifiers;
   sum and difference signal deriving means coupled to receive the output of each said logarithmic amplifier; and
   means connected to the sum and difference signal deriving means of each adjacent pair of channels for deriving an elevation error signal, a range signal, and an azimuth error signal.

5. The system as defined according to claim 1 but further characterized by said means producing azimuth control signals comprising:
- a source of digital command signals;
- an azimuth switching control circuit having a plurality of outputs; and
- a bank of traveling wave tubes, each tube being connected to receive an output of said azimuth switching control circuit.

6. The system as defined according to claim 5 but further characterized by said means for producing elevation control signals comprising:
- a source of elevation digital command signals;
- an elevation control frequency generator for producing changes of frequency corresponding to desired changes in antenna beam tilt;
- a source of trigger pulses; and
- a pulse offset modulator connected to said source of trigger pulses and to said elevation frequency control generator for causing said elevation control frequency generator to shift its frequency by a predetermined amount whereby the elevation control frequency generator may produce signals for employment as local oscillations for said receiving means.

7. A radar tracking system employing a fixed array antenna, comprising:
- azimuth control signal producing means;
- parasitic array lens means for producing at its output side a linear phase delay according to the location of azimuth signals applied to its input side;
- input signal coupling means connecting said signal producing means to the input side of said lens means;
- output signal coupling means for passing signals from the output side of said lens means to the fixed array antenna;
- receiving means including a plurality of channels, one channel for each location of application of input signals to said lens means, said receiving means being coupled to said lens means for receiving return echo signals from the fixed array antenna; and
- transmit/receive switching means connected between the fixed array antenna and said lens means for selective control of transmission and reception of radar signals.

8. The system as defined according to claim 7 but further characterized by said parasitic array lens means comprising one lens for transmission and another lens for receiving, each of said lens being connected to said transmit receive switching means.

9. The system as defined according to claim 7 but further characterized by said lens means comprising a single parasitic lens array, said system further comprising:
- a transmit/receive switch for each location of application of the input signal to the input side of said lens for passing transmitting signals to said lens and said switch being connected to said receiving means for passing received signals to each channel of said receiving means;
- a non-reciprocal directional wave propagation element for each location on the output side of said lens at which signals for transmission and reception are applied, said element providing different paths for transmitted and received signals respectively; and
- separate path means between said antenna and said non-reciprocal directional propagation element for transmitted and received signals respectively.

10. The system as defined according to claim 7 but further comprising elevation control signal producing means for varying the tilt of the transmitted beam as a function of frequency variation.

11. The system as defined according to claim 7 but further characterized by said lens means having a curved input surface of a constant radius equal to the centerline distance between the input and output surfaces of said lens means, and having an output surface of an approximately parabolic curve, whereby the phase relationship between successive adjacent transmission lines through said lens means is linear.

12. A radar tracking system employing a fixed array antenna, comprising:
- an elevation control frequency generator responsive to digital command signals for producing frequency varying CW signals in accordance with desired tilt of the beam to be transmitted;
- a trigger pulse generator;
- a pulse offset modulator connected to said trigger pulse generator and to said elevation control signal generator for shifting the frequency of said elevation control signal generator by amount equal to the average intermediate frequency offset, whereby said CW signals may be further employed as local oscillations for receiving purposes;
- an azimuth control switch ciricuit responsive to digital command signals for selectively energizing adjacent pairs of output lines, one pair of lines for each beam position;
- a bank of normally blocked traveling wave tube amplifiers, two adjacent amplifiers when energized defining each position of beam transmission, each traveling wave tube being connected to said elevation control frequency generator and to a line of said azimuth control switch circuit whereby when a pair of lines is energized, a corresponding pair of traveling wave tubes is unblocked to thereby pass azimuth determining pulses and elevation determining signals;
- further amplification means connected to each of said traveling wave tube amplifiers;
- a transmit/receive switch connected to each of said amplification means;
- a parasitic array lens having a circular input focal locus and an approximately parabolic output focal locus, said lens having a plurality of input coupling elements located on the input focal locus one element for each of said lines, and a plurality of output coupling elements located on the output focal locus, one corresponding to each input coupling element, whereby signals appearing at an energized pair of input coupling elements appear at a corresponding pair of output coupling elements in predetermined linear phase relationship to other pairs of output coupling elements when energized;
- a plurality of non-reciprocal wave directing elements, each element being connected to a corresponding one of said output coupling elements;
- a plurality of transmitting paths each including amplifying means, each of said paths being connected to a corresponding one of said wave directing elements and to an element of the fixed array antenna;
- transmit/receive switching means in each of said transmission paths;
- a receiving path connecting each of said transmit receive switches to a corresponding one of said wave directing elements, whereby return signals are supplied to said parasitic array lens via said receiving path;
- a mixer connected to each tube of said bank of traveling wave tubes and to each of said transmit/receive switches; and
- further means connected to each of said mixers for producing elevation azimuth and range error signals.

No references cited.

CHESTER L. JUSTUS, *Primary Examiner.*